(12) United States Patent
Samuel et al.

(10) Patent No.: US 12,524,606 B2
(45) Date of Patent: Jan. 13, 2026

(54) PREDICTING A COMPLETION PERCENTAGE OF AN ELECTRONIC PROCESS

(71) Applicant: INTUIT INC., Mountain View, CA (US)

(72) Inventors: John Samuel, Bangalore (IN); Swetha Seenappa, Bangalore (IN); Srivathsal Venkataramu, Bangalore (IN)

(73) Assignee: INTUIT INC., Mountain View, CA (US)

( * ) Notice: Subject to any disclaimer, the term of this patent is extended or adjusted under 35 U.S.C. 154(b) by 198 days.

(21) Appl. No.: 18/591,218

(22) Filed: Feb. 29, 2024

(65) Prior Publication Data

US 2025/0278549 A1 Sep. 4, 2025

(51) Int. Cl.
*G06F 17/00* (2019.01)
*G06F 40/166* (2020.01)

(52) U.S. Cl.
CPC .................. *G06F 40/166* (2020.01)

(58) Field of Classification Search
CPC ............ G06F 40/166; G06F 40/174
See application file for complete search history.

(56) References Cited

U.S. PATENT DOCUMENTS

| | | | | |
|---|---|---|---|---|
| 7,426,496 | B2* | 9/2008 | Kristjansson | G06F 40/174 706/10 |
| 10,671,805 | B2* | 6/2020 | Pennington | G06Q 40/123 |
| 10,733,556 | B2* | 8/2020 | Bencke | G06Q 10/0633 |
| 11,475,214 | B1* | 10/2022 | Chacko | G06F 40/174 |
| 11,615,236 | B1* | 3/2023 | Sharma | G06F 40/174 715/222 |
| 12,124,793 | B2* | 10/2024 | Jain | G06F 40/20 |
| 2014/0123057 | A1* | 5/2014 | Eigner | H04W 4/08 715/780 |
| 2017/0192948 | A1* | 7/2017 | Gaither | G06F 40/174 |
| 2019/0385071 | A1* | 12/2019 | Von Bencke | G06N 7/01 |
| 2020/0250550 | A1* | 8/2020 | Bissell | G06F 3/0481 |
| 2020/0342404 | A1* | 10/2020 | Jackson | G06F 16/958 |
| 2021/0326517 | A1* | 10/2021 | Lind | G06F 16/9035 |
| 2022/0101061 | A1* | 3/2022 | Mehta | G06N 20/00 |
| 2023/0315976 | A1* | 10/2023 | Braga | G06F 40/205 715/780 |
| 2024/0303418 | A1* | 9/2024 | Daniel | G06F 40/174 |
| 2025/0156626 | A1* | 5/2025 | Quiles-Perez | G06F 3/0484 |
| 2025/0173502 | A1* | 5/2025 | Myers | G06F 3/0482 |
| 2025/0190691 | A1* | 6/2025 | Mai | G06F 40/174 |

* cited by examiner

*Primary Examiner* — Laurie A Ries
(74) *Attorney, Agent, or Firm* — Patterson + Sheridan, LLP

(57) ABSTRACT

Aspects of the present disclosure relate to assisting users in completing forms. Embodiments include retrieving data associated with a form comprising a total number of fields of the form and an indication of a level of complexity of a field of the form. Embodiments further include retrieving data associated with a user comprising a number of fields of the form the user has completed and an amount of time the user has spent completing a respective field of the form. Embodiments further include providing the data associated with the form and the data associated with the user to a machine learning model, and predicting an amount of user progress in completing the form, or a an amount of time required for the user to complete a given field of the form. Embodiments further include receiving the prediction from the machine learning model.

20 Claims, 4 Drawing Sheets

PREDICTING A COMPLETION PERCENTAGE OF AN ELECTRONIC PROCESS

INTRODUCTION

Aspects of the present disclosure relate to techniques for generating a prediction regarding the amount of user progress in completing an electronic process, such as completing an electronic form, and the amount of time required to complete the electronic process.

BACKGROUND

Every year millions of people, businesses, and organizations around the world utilize software applications to assist with completing complex documents such as forms. For example, many individuals rely on software applications for filing their yearly income tax returns. Software applications may be configured to allow users to complete forms, such as those used in tax returns, through interactions with a user interface.

Completing these forms is often a complex and tedious process, and it can be difficult to determine how close a user is to finishing populating the form. For instance, a user may have completed a majority of the fields of the form, but the completed fields may be less complex than the remaining fields. In another example, because of the skills or experience of a user, the remaining fields of a form may be more challenging for the user to complete than the completed fields. In either case, less than half of the required work would have been completed even though the user had completed more than half of the fields of the form. The difficulty in determining how much work and time remains in completing a form is compounded for entities such as those that manage form filing software applications. Accurately tracking the workload and progression of a large number of users in this context is extremely difficult, which makes providing interventions to assist users difficult as well. Existing techniques for automatically tracking progress of users, such as those that base a determination primarily on the total number of fields or steps that have been completed and/or that remain in an electronic process, generally lack accuracy due to the various factors that affect completion time that are not evident based on such automated analysis, Without an accurate way to automatically monitor user progress in completing forms and other electronic processes, processor resources may be wasted in providing interventions that are not necessary, or in neglecting to provide interventions to users who need them.

Thus, there is a need in the art for improved techniques of automatically predicting completion percentages for electronic processes.

BRIEF SUMMARY

Certain embodiments provide a method of assisting users in completing forms. The method generally includes: retrieving data associated with a form, wherein the data associated with the form comprises: a total number of fields of the form, and an indication of a level of complexity of a field of the form; retrieving data associated with a user, wherein the data associated with the user comprises: a number of fields of the form the user has completed, and an amount of time the user has spent completing a respective field of the form; providing the data associated with the form and the data associated with the user to a machine learning model, wherein the machine learning model has been trained to generate a prediction comprising one or more of: a predicted amount of user progress in completing the form, or a predicted time required for the user to complete a given field of the form; and receiving the prediction from the machine learning model in response to the data associated with the form and the data associated with the user.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
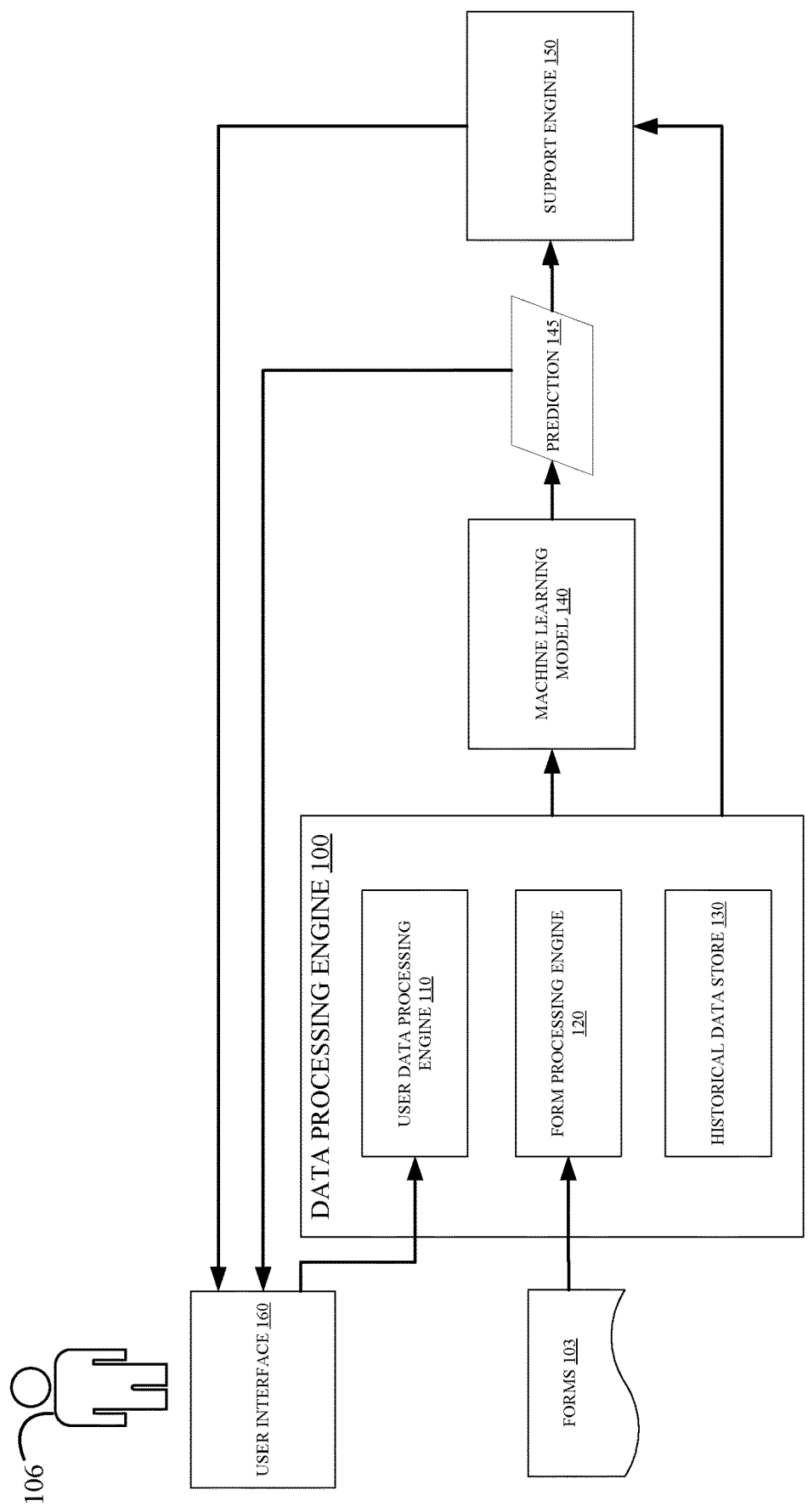
FIG. 1 depicts an example of computing components related to assisting users in completing forms.

Aspects of the present disclosure provide apparatuses, methods, processing systems, and computer-readable mediums for automatically predicting completion percentages for electronic processes and assisting users in completing such electronic processes.

According to certain embodiments, a machine learning model is used to generate a prediction regarding a user's progress in completing an electronic process, such as completing an electronic form, or a time required for the user to complete such an electronic process. In some cases, support interventions are performed based on the prediction (e.g., if a user takes longer than a predicted amount of time to complete the electronic process, support interventions may be provided).

Many examples are described herein with respect to completing electronic forms, but is noted that embodiments of the present disclosure may be performed for predicting completion percentages or times for other types of electronic processes, such as interacting with or consuming electronic content, navigating through electronic applications, and/or the like, Forms generally refer to any type of document that a user may complete by populating the document with information. For example, loan application forms are documents that require applicants to populate the document with information such as the applicant's name and income level. Forms may contain fields that comprise spaces for entering information such as an individual's name, date of birth, social security number, income, and/or the like. Fields may also include multiple choice questions. For example, a tax form may have a field that asks if anybody claims the filer as a dependent. If somebody claims the filer as a dependent, the filer or a person completing the form on the filer's behalf would select "yes" as the answer to the question.

In some embodiments, data associated with a form is retrieved. The data associated with the form may include the total number of fields of the form, the number of a specific type of field in the form, information regarding the fields of the form, and/or the like. The data associated with the form may include an indication of the level of complexity of a field within the form. For example, the data may include an indication that a field is asking for an individual's name. This could be an indication that the field is not complex, since entering an individual's name is a relatively simple task. As another example, the data may include an indication that a field is asking for a tax filer's gross income for a given year. This could be an indication that the field is highly complex, since calculating an individual's gross income can be a relatively complicated and tedious process. The data associated with the form may also include an indication that certain fields are required and/or that certain fields are not required.

Certain embodiments provide that data associated with a user of a form completion software application is retrieved. The data associated with the user may include a number of fields of a form the user has completed. The data may include an amount of time that the user took to complete a field of the form. The amount of time the user takes to complete a field of the form may be indicative of the proficiency of the user in completing such forms. For example, if a user takes longer than expected to complete a relatively simple form, this amount of time may indicate that the user has a low level of proficiency at completing forms. As another example, if a user completes a relatively complex form quicker than expected, this amount of time may indicate that the user has a high level of proficiency at completing forms. Users with a high level of proficiency may require less time to complete forms than users with a low level of proficiency require.

In certain embodiments, the data associated with the form and the data associated with the user are provided to a machine learning model. The machine learning model may be trained to generate a prediction based on this data and indications found within the data, such as those discussed above. The prediction may comprise a predicted amount of user progress in completing the form (e.g., a completion percentage), a predicted time required to complete a given field of the form, and/or the like. As an example, a user may have completed half of the fields of a form. The data associated with the form may indicate that the completed fields were relatively simple compared to the remaining fields. The data associated with the user may indicate that the user has historically taken a longer amount of time compared to other users to complete fields that are like the remaining fields. Based on this data, the machine learning model may generate a prediction that the user is less than half finished with completing the form (i.e., the user has completed less than half of the labor required to complete the form). As another example, a different user may have also completed half of the fields of the form. Data associated with this user may indicate that this user has a high level of proficiency. Data may indicate that highly proficient users can complete the remaining fields faster than the completed fields. Based on this data, the machine learning model may generate a prediction that the user is more than half finished with completing the form (i.e., the user has completed more than half of the labor required to complete the form). The prediction may also include a sequence for completing the remaining fields that, if performed, will maximize the speed at which the form may be completed and/or ensure that particular parts of the form are completed. For example, completing the fields in an order suggested by the prediction may result in completing the most important fields first, and relatively unimportant fields may be completed later, autofilled, or omitted due to time constraints.

According to some embodiments, the prediction generated by the machine learning model may be used to provide outputs to users of the form completion software application. The outputs may give the users an indication of how much labor remains to be performed in order to complete the form, or how much time it will take to complete the form.

Some embodiments provide that the prediction is used to provide support interventions to users. For example, if a user is taking longer than a predicted amount of time to complete a field of a form, this may indicate that the user is experiencing a problem with completing the form (e.g., data required for completing the form is missing or inaccessible). In certain embodiments, a computing environment may be configured to automatically provide the user with a support intervention in response to the user exceeding a predicted amount of time to complete a field. For example, the support intervention may comprise routing the user to a live support session or an automated support session (e.g., a chat bot). Other actions may be performed based on the prediction. For example, organizations that utilize multiple workers to complete forms may use the predictions to evaluate the performance of the workers. Actions may also be performed within the form filling software application based on the prediction, such as providing the user with additional data, providing the user with recommendations, or prompting the user to seek external support, such as a support session as discussed above.

Certain embodiments provide that the machine learning model may be retrained based on data associated with forms and data associated with users as users complete forms within the software application over time. This results in a feedback loop through which the predictions may be continuously improved. For example, if users consistently require a longer amount of time than predicted to complete a field of the form, the machine learning model will be retrained to accurately predict the amount of time that a user will take to complete the field.

According to certain embodiments, the machine learning model may predict the level of complexity of a field of the form. For example, the predicted complexity may be based on factors such as the size of the field, the length of the field's description, the amount of time that historical users required to complete the field or similar fields, the type of information required by the field, similarity of the field to other fields for which complexity has been determined, and/or the like. This prediction may be used by the machine learning model to predict the amount of user progress and/or the time required for the user to complete the field.

In some embodiments, the machine learning model may predict the proficiency of a user. For example, the predicted proficiency may be based on the amount of time that the user requires to complete a field compared to other users, historical data regarding the amount of time the user requires to complete forms compared to other users, the complexity of the fields completed by the user, the complexity of data required to complete fields that the user has completed, indications that the user's progress was delayed for reasons outside of the user's control (e.g., the user was not given all of the required information for completing a field), and/or the like.

In certain embodiments, the prediction as to the amount of user progress or the amount of time required may be based on the amount of required information that is already available to the user of the form completion software application. For example, the form may contain a relatively complicated field that the user must complete, but the information required for this form is available to the user, and the user can automatically enter the information into the field (e.g., by autofill, import, copying and pasting the information from elsewhere in the form or in another form, and/or the like). Since the required information is available to be automatically inserted into the field, the predicted time to complete the field will be small despite the complexity of the field. Also, the prediction may be based on an indication as to whether the field is required. For example, if it is known that a field is not required, the presence of this field inside a form may not increase a predicted amount of time required to complete the form.

In alternative embodiments, a machine learning model as described herein is used to predict completion percentages or times of other types of electronic processes (e.g., other than completing forms) in a similar manner. For example, rather than field-specific features, such embodiments may involve providing step-specific or task specific features along with user-specific features as inputs to the machine learning model. Furthermore, users may be provided with support interventions and/or other content (e.g., a recommended series of steps or tasks) relating to completing such other electronic processes based on a prediction determined using techniques described herein.

Embodiments of the present disclosure provide numerous technical and practical effects and benefits. For instance, generating automated predictions regarding progress in completing electronic processes and/or time expected to complete electronic processes in a manner that is more accurate than other techniques for generating such automated predictions (e.g., those based primarily on the number of fields or steps that have been completed) allows for improved assessment of a user's workload and efficiency. Through the use of targeted, dynamic features such as user-specific data and field-specific data (or step-specific or task-specific data) as inputs to a machine learning model, embodiments of the present disclosure allow for generation of a more accurate and dynamic automated prediction of a completion percentage or time than alternative automated techniques that do not rely on such features. Also, techniques described herein are better able to automatically provide support interventions to users than existing techniques. For instance, by accurately predicting when users need interventions through the use of particular machine learning techniques, embodiments of the present disclosure allow for issues regarding the completion of electronic processes to be automatically addressed and resolved through the use of support interventions. This accurate and automatic allocation of support resources avoids the utilization of computing resources that would otherwise result from providing interventions to users who do not need interventions, while also eliminating the utilization of computing resources that would result from not providing support to users who are experiencing issues that could be more efficiently resolved with such an intervention.

Additionally, as discussed above, by utilizing an active feedback loop through which user data and form data are used to retrain the model as users complete electronic processes, techniques described herein allow the predictions and the corresponding support provision system to be continuously improved.

Example Computing Components Related to Assisting Users in Completing Electronic Processes FIG. 1 is an illustration of example computing components related to assisting users in completing electronic processes.

One or more forms 103 may be provided to a data processing engine 100. Forms 103 may be any type of electronic document that a user may complete by adding information to the document. Examples of forms include tax forms, medical forms, loan application forms, registration forms, and/or the like. A form 103 may contain one or more fields into which information may be inserted. Fields may comprise labeled spaces for entering information such as an individual's name, date of birth, social security number, income, and/or the like. Fields may comprise multiple choice questions, questions with check boxes, and/or the like.

A user 106 may interact with a form filing software application through a user interface 160. The data processing engine 100 may receive user data from one or more users 106 through one or more user interfaces 160.

The data processing engine 100 may include a form processing engine 120. The form processing engine 120 may comprise one or more processors configured to electronically store forms 103. In some embodiments, the form processing engine 120 may be configured to extract information from the forms 103, as discussed in further detail below with respect to FIG. 2.

The data processing engine 100 may comprise a user data processing engine 110. The user data processing engine 110 may comprise one or more processors configured to store user data that is received from the user interface 160, as discussed in further detail below with respect to FIG. 2.

The data processing engine 100 may comprise a historical data store 130. The historical data store may comprise a data storage medium configured to store historical form data and user data, as discussed in further detail below with respect to FIG. 2.

The data within the data processing engine 100 may be provided to a machine learning model 140. The machine learning model 140 may be trained to generate a prediction 145 based on the user data and the form data. As discussed above, the prediction may comprise a predicted amount of user progress in completing the form 103 (e.g., a completion percentage), a predicted time required to complete a given field of the form 103, and/or the like. The prediction 145 may also include a predicted level of proficiency of a user 106, a predicted level of complexity of a field of a form 103, and/or the like. The machine learning model 140 may be trained to recognize indications within historical user data and historical form data from the historical data store 130 and generate predictions 145 based on these indications. Also, the machine learning model 140 may be retrained or fine-tuned using user data and form data that is received as the user 106 interacts with the software application. The user data and form data may provide indications of how much time different fields require to complete and/or what percentage of the total amount of work required for completing a form 103 corresponds to completing a particular field. For example, if a field of a form 103 requires a large amount of information or complicated calculations and/or if users 106 typically require a long amount of time to complete the field, the predicted time for completing the field may be relatively large, the predicted complexity of the field may be relatively high, and/or completion of the field may represent a large percentage of a user's predicted progress or required labor in completing the form 103.

The predicted complexity of the form 103 may be used to make other predictions. For example, if a field is predicted to be highly complex, it may be predicted that the field will take a relatively long time to complete. As another example, if a field is predicted to be highly complex, completing this field may represent a relatively high percentage of the total progress toward completing a form. Also, if a user quickly completes a field that is predicted to be highly complex, the predicted level of proficiency of the user may be high.

The predicted time for completing a field and the predicted level of user progress may be based on the data that is used to populate the form 103. For example, the data used to populate a field of the form 103 may indicate that an individual engaged in a large number of transactions, and another field may require entering the individual's gross income. Calculating the gross income for that individual may require a relatively large amount of time or represent a relatively large percentage of the work required for completing the form 103 compared to completing the form 103 for an individual who engaged in fewer transactions. According to certain embodiments, it may be determined through automated analysis of data available to the software application that data used for populating a field is already available to the user 106 inside the software application. For example, information corresponding to an individual may have been previously entered into another location within the software application, such as a field within another form. The user 106 may be able to enter this information into the form 103 automatically such as through using autofill, import, or a copy and paste function. Because this information was available for automatic entry, the predicted time for completing the field may be small, and the predicted level of completion may be increased only slightly once this field is completed.

Data used to populate the form 103 may also indicate whether a field is required. For example, if data entered into a form 103 indicates that an individual was unemployed, then a field for entering the individual's wages may not be required. Other indications may be provided as to whether the field is required. For instance, it may be known that a field is not required. If a field is not required, the field may not contribute to the predicted level of user progress or a predicted total time remaining to complete the form 103.

User data and form data also provide indications of different users' proficiencies in completing forms 103. For example, if a user 106 completes forms 103 more slowly and/or makes more mistakes in completing forms 103 and/or fields than other users 106, then the predicted level of proficiency of the user 106 may be low. The predicted level of proficiency may be based on one or more other predicted features within the prediction 145. For example, if it is predicted that a field is highly complex, then the predicted proficiency of a user 106 may not be decreased even if the user 106 required a large amount of time to complete the field. Also, the proficiency of a user 106 may be predicted based on other factors, such as the amount of errors a user 106 made in completing a field. The availability of required information may also impact the proficiency determination. For example, a user 106 may have quickly completed a complex field by automatically filling the field, for example, with data contained within the software application (through autofill, copy and paste, or the like). The machine learning model 140 may be configured to recognize that the information was available for automatically filling the field so that it will avoid predicting an inappropriately large level of proficiency for a user 106 when the user's speed in completing the field was actually based on the availability of the data for automatically populating the field. According to some embodiments, the predicted proficiency may be based on the level of experience of a user 106 or length of time that a user 106 has used the software application. For example, an individual who has been using a form filing software application for several years may have a higher predicted proficiency than an individual who has no experience using the software application.

The predicted proficiency may be used to predict the amount of progress the user 106 has made in completing a form 103. For example, the user 106 may have a high predicted level of proficiency for completing a first type of field, and a low predicted level of proficiency for completing a second type of field. Based on these predicted proficiencies, it may be predicted that completing a field of the second type represents a greater amount of progress towards completing the form 103 than completing a field of the first type (e.g., completing a field of the first type increases the predicted completion percentage by one percent, while completing a field of the second type increases the predicted completion percentage by five percent). The predicted proficiency of the user 106 may be used to generate a prediction regarding the amount of time the user 106 will take to complete a field. For example, if the user 106 is predicted to be highly proficient, it may be predicted that the user 106 will complete a field in a relatively short amount of time compared to a user of low proficiency.

The predicted proficiency of one user may be used to generate predictions regarding other users. For example, a first user may have completed a field in a given time. The predicted time required for a second user to complete the same field may be determined based on a correlation between the proficiency of the first user and the second user. For instance, if the first user was predicted to be exceptionally proficient and the second user was predicted to have an average proficiency, then the time predicted for the second user to complete the field may be greater than the time predicted for the first user to complete the same field. The predicted complexity of fields may also be generated based on user proficiencies. For example, if a user that is predicted to be exceptionally proficient requires a long amount of time to complete a field, this may result in a prediction that the field is highly complex. Also, the predicted complexity of a field may be based on the amount of errors that users 106 made in completing the field. For example, if a highly proficient user makes several errors in completing a field, the predicted level of complexity of the field may be high.

A machine learning model 140 trained with historical user and form data to recognize indications such as those discussed above may accurately generate predictions 145 regarding the amount of time remaining for a user 106 to complete a form 103, a level of user 106 progress in completing a form 103, a level of complexity of fields of a form 103, and/or a level of proficiency of a user 106. Re-training and/or fine-tuning the machine learning model 140 with user data and form data received as users 106 interact with the software application further increases the accuracy of the predictions 145. Training or fine-tuning the machine learning model 140 may involve supervised and/or unsupervised learning processes. Supervised learning techniques generally involve providing training inputs (e.g., representing a user and fields of a form) to the machine learning model 140. The machine learning model 140 processes the training inputs and generates predictions based on the training inputs (e.g., indicating a predicted completion percentage for the form or a predicted amount of time to complete the form based on the inputs). The predictions are compared to the known labels associated with the training inputs (e.g., the known labels may indicate an actual completion percentage or an actual remaining time that was taken to complete the form based on historical application data indicating what happened after the point represented by the training inputs) to determine the accuracy of the machine learning model 140, and parameters of the machine learning model 140 are iteratively adjusted until one or more conditions are met. For instance, the one or more conditions may relate to an objective function (e.g., a cost function or loss function) for optimizing one or more variables (e.g., model accuracy). In some embodiments, the conditions may relate to whether the predictions produced by the machine learning model 140 based on the training inputs match the known labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and the like. In some embodiments, validation and testing are also performed for a machine learning model 140, such as based on validation data and test data, as is known in the art.

There are many different types of machine learning models that can be used in embodiments of the present disclosure. For example, the machine learning model 140 may be a boosted tree model, a neural network, a support vector machine, a Bayesian belief network, a regression model, or a deep belief network, among others. Models may also be an ensemble of several different individual machine learning models. Such an ensemble may be homogenous (i.e., using multiple member models of the same type, such as a random forest of decision trees) or non-homogenous (i.e., using multiple member models of different types). Individual machine learning models within such an ensemble may all be trained using the same subset of training data or may be trained using overlapping or non-overlapping subsets randomly selected from the training data.

The machine learning model 140 may comprise one or more tree models. A tree model (e.g., a decision tree) makes a classification by dividing the inputs into smaller classifications (at nodes), which result in an ultimate classification at a leaf. Boosting, or gradient boosting, is a method for optimizing tree models. Boosting involves building a model of trees in a stage-wise fashion, optimizing an arbitrary differentiable loss function. In particular, boosting combines weak "learners" into a single strong learner in an iterative fashion. A weak learner generally refers to a classifier that chooses a threshold for one feature and splits the data on that threshold, is trained on that specific feature, and generally is only slightly correlated with the true classification (e.g., being at least more accurate than random guessing). A strong learner is a classifier that is arbitrarily well-correlated with the true classification, which may be achieved through a process that combines multiple weak learners in a manner that optimizes an arbitrary differentiable loss function. The process for generating a strong learner may involve a majority vote of weak learners.

A random forest extends the concept of a decision tree model, except the nodes included in any give decision tree within the forest are selected with some randomness. Thus, random forests may reduce bias and group outcomes based upon the most likely positive responses.

Predictions 145 may be presented to users 106 through the user interface 160. The predictions 145 may help users 106 and other entities to understand how much work and/or how much time remains for them to complete the form 103, which enables them to take actions within the software application based on the predictions 145. Predictions 145 and the data contained within the data processing engine 100 may also be provided to a support engine 150. The support engine 150 may comprise one or more processors configured to provide support interventions to users 106. The support interventions may include, for example, routing the user to a live support session or an automated support session, or presenting the user 106 with an option to receive support. For example, if a user 106 experiences difficulties in completing a form 103 (e.g., the user 106 does not have access to all of the information required to complete a form 103), the user 106 may require a longer amount of time than a predicted amount of time to complete the form 103. In such cases, support may be automatically provided to the user 106 based on the prediction 145. Support interventions may also include automatically presenting users 106 with advice on how to complete a form 103, as well as other support interventions known in the art.

The support engine 150 may also present predictions 145 to other entities associated with a form filing software application, such as administrators of the application. The other entities may use the predictions to evaluate the performance of users 106 in completing forms 103. For example, a company may determine the efficiency of employees who complete forms using the software application based on the predictions 145 (e.g., by comparing the amount of time an employee required to complete a form to a predicted amount of time for the employee to complete the form).

Figure 2:
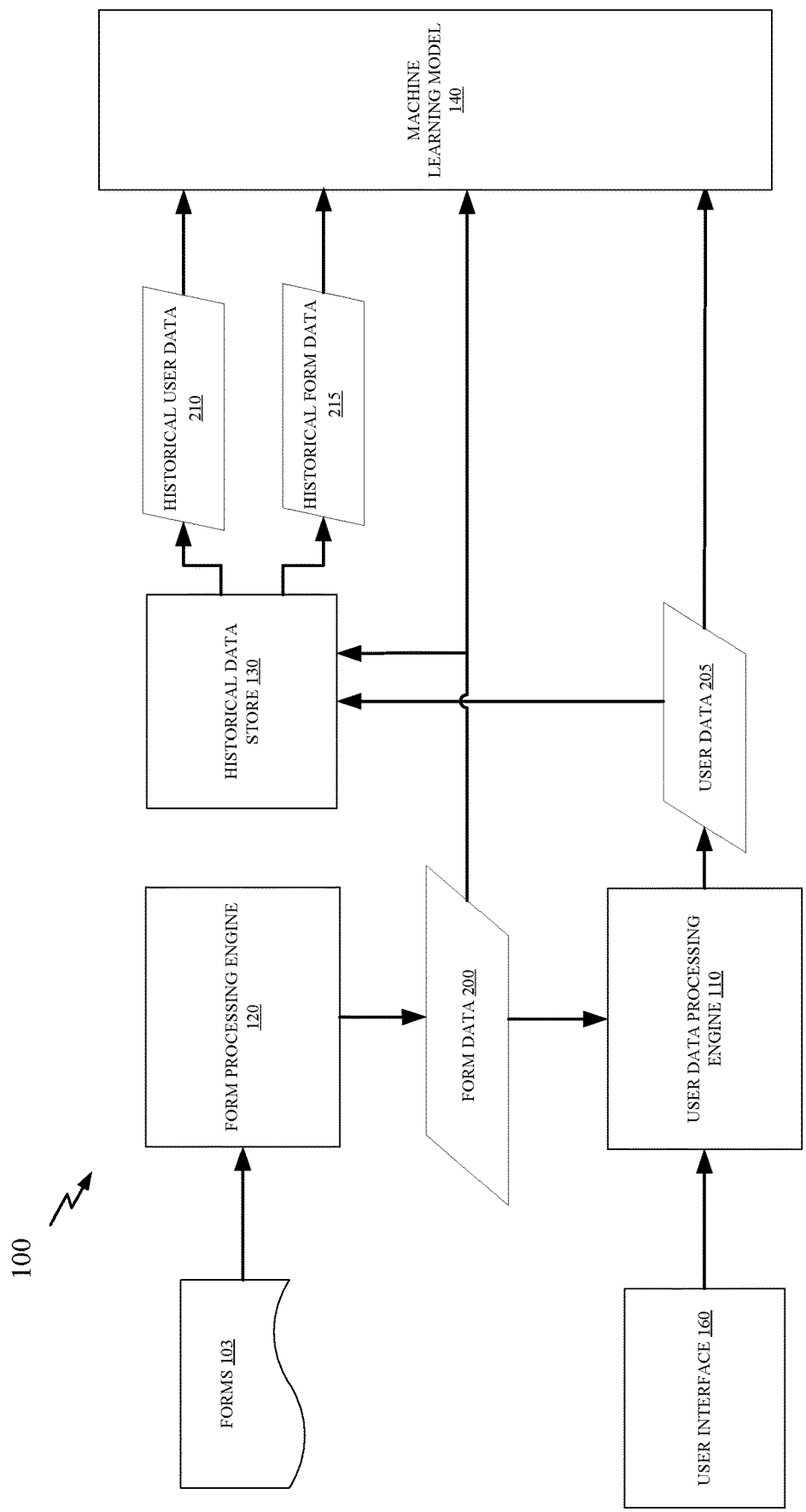
FIG. 2 depicts an example of computing components related to assisting users in completing forms.

Example Computing Components Related to
Assisting Users in Completing Electronic Processes FIG. 2 is an illustration of example computing components related to assisting users in completing electronic processes.

As discussed above with respect to FIG. 1, forms 103 and data from a user interface 160 may be provided to a data processing engine 100. The data processing engine 100 may comprise a user data processing engine 110, a form processing engine 120, and a historical data store 130.

Forms 103 may be provided to the form processing engine 120. The form processing engine 120 may comprise one or more processors configured to electronically store forms 103. In some embodiments, the form processing engine 120 may be configured to extract information from the forms 103. This information extraction may be achieved, for example, by creating an embedding representation of the forms 103. An embedding generally refers to a vector representation of an entity that represents the entity as a vector in n-dimensional space such that similar entities are represented by vectors that are close to one another in the n-dimensional space. The form processing engine 120 may generate embeddings through the use of an embedding model, such as a neural network or other type of machine learning model that learns a representation (embedding) for a form 103 through a training process that trains the neural network based on a data set, such as a plurality of features of a plurality of forms 103. In one example, the embedding model comprises a Bidirectional Encoder Representations from Transformer (BERT) model, which involves the use of masked language modeling to determine embeddings. In a particular example, the embedding model comprises a Sentence-BERT model. In other embodiments, the embedding model may involve embedding techniques such as Word2Vec and GloVe embeddings. These are included as examples, and other techniques for generating embeddings are possible.

The form data 200 extracted by the form processing engine 120 generally comprises any type of data related to the form 103. For example, the form data 200 may include the number of fields of a form 103, information indicating the complexity of a form 200 and/or its fields (e.g., the number of words associated a field, the type of information required by a field, the meanings of words and sentences associated with the fields, and/or the like), information that has been entered into the form 103, information that is available for automatic entry into the form (e.g., information that is located within the software application that has been determined to be appropriate to enter into a field of the form 103 by autofill, copy and paste, or similar techniques for automatic entry of data), identifiers associated with a form 103, and/or similar types of data.

Data from the user interface 160 may be received by the user data processing engine 110, which may comprise one or more processors configured to store user data 205. The user data 205 may comprise log user activity data, which may include information about user input as well as timestamps associated with the inputs. In some embodiments, the user data processing engine 110 may also receive form data 200 extracted by the form processing engine 120. This allows for the creation of user data 205 that associates user inputs with the forms 103. For example, a click made by a user may be associated with a check box contained within the form 103 which the user clicked.

The user data 205 and the form data 200 may be provided to a historical data store 130. The historical data store 130 may comprise one or more processors configured to store user data 205 and form data 200 from a multitude of users. Historical user data 210 and historical form data 215 may be provided to a machine learning model training component in order to train machine learning model 140, as discussed above.

User data 205 and form data 200 may be provided to machine learning model 140 in order to generate predictions, as discussed above. Also, the user data 205 and form data 200 may be used to retrain or fine-tune the machine learning model.

User data 205, form data 200, historical user data 210, and/or historical form data 215 may be provided to a support engine. The support engine may use this data to determine when to provide interventions to users, as discussed above with respect to FIG. 1. For example, if the data indicates that a user has taken longer than predicted to complete a field of the form 103, a support intervention may be provided to the user.

Figure 3:
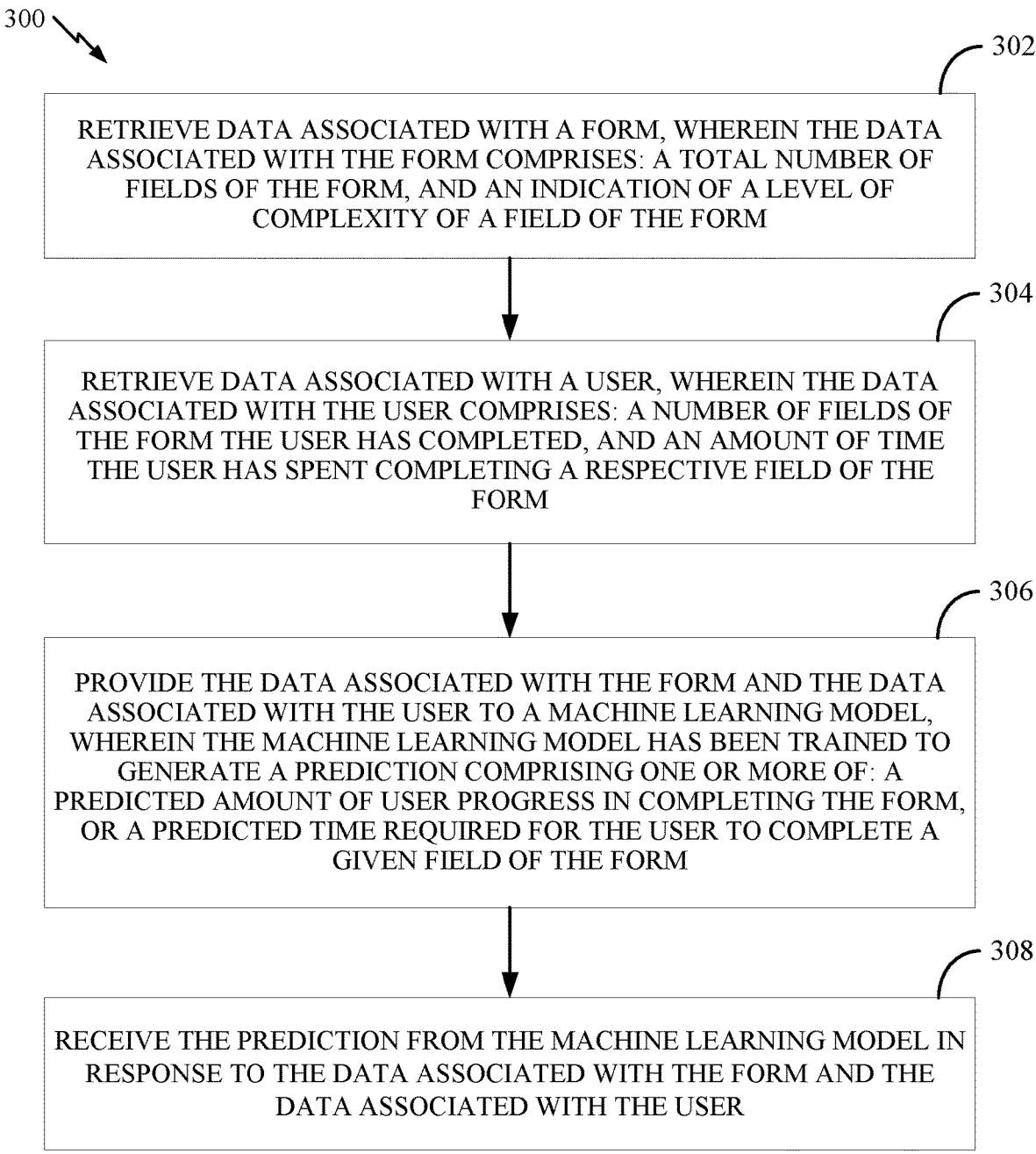
FIG. 3 depicts example operations related to assisting users in completing forms.

Example Operations Related to Assisting Users in Completing Electronic Processes FIG. 3 depicts example operations 300 related to assisting users in completing electronic processes. For example, operations 300 may be performed by one or more of the components described in FIG. 1 and FIG. 2.

Operations 300 begin at step 302 with retrieving data associated with a form, wherein the data associated with the form comprises: a total number of fields of the form, and an indication of a level of complexity of a field of the form. In some embodiments, a machine learning model is retrained based on the data associated with the form.

Operations 300 continue at step 304 with retrieving data associated with a user, wherein the data associated with the user comprises: a number of fields of the form the user has completed, and an amount of time the user has spent completing a respective field of the form. In certain embodiments, a machine learning model is retrained based on the data associated with the user.

Operations 300 continue at step 306 with providing the data associated with the form and the data associated with the user to a machine learning model, wherein the machine learning model has been trained to generate a prediction comprising one or more of: a predicted amount of user progress in completing the form, or a predicted time required for the user to complete a given field of the form. According to some embodiments, the prediction further comprises a predicted level of complexity of a particular field of the form. Certain embodiments provide that the machine learning model has been trained to generate the predicted level of complexity based on amounts of time that historical users took to complete the particular field. In some embodiments, the predicted amount of user progress in completing the form is predicted based on the predicted level of complexity of the particular field of the form. Some embodiments provide that the predicted time required for the user to complete the given field of the form is predicted based on the predicted level of complexity of the field. According to certain embodiments, the prediction further comprises a predicted proficiency of the user. In certain embodiments, the predicted amount of user progress in completing the form is predicted based on the predicted proficiency of the user. Some embodiments provide that the machine learning model comprises a neural network that has been trained based on historical data associated with users and forms. According to some embodiments, the prediction is based on an amount of required information associated with uncompleted fields of the form that is available to be automatically entered into the form.

Operations 300 continue at step 308 with receiving the prediction from the machine learning model in response to the data associated with the form and the data associated with the user. Certain embodiments provide that one or more user support interventions are performed based on the user taking a longer amount of time than the predicted time required for the user to complete the given field of the form. Some embodiments comprise performing one or more actions within a software application based on the prediction.

Figure 4:
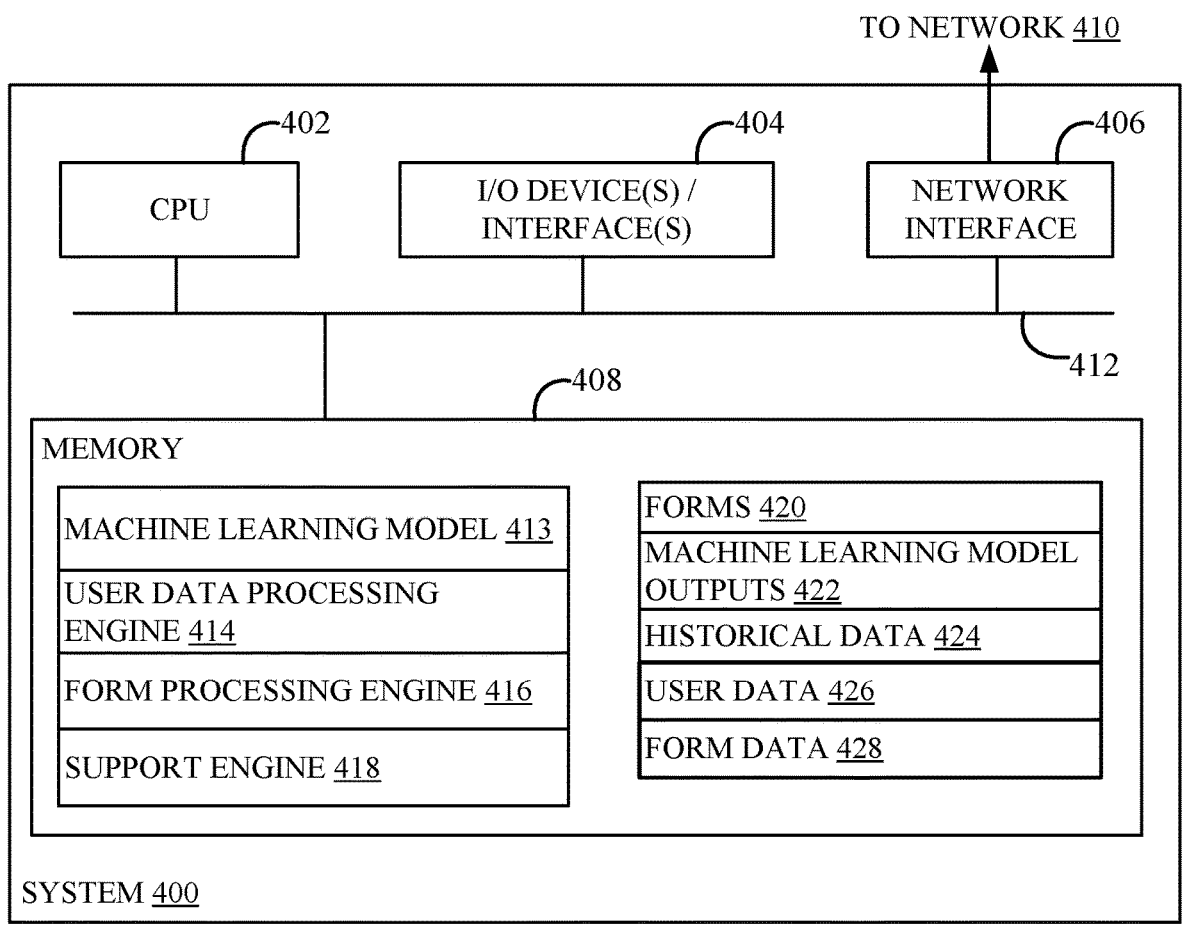
FIG. 4 depicts an example of a processing system for assisting users in completing forms.

Example of a Processing System for Assisting Users in Completing Electronic Processes FIG. 4 illustrates an example system 400 with which embodiments of the present disclosure may be implemented. For example, system 400 may be configured to perform operations 300 of FIG. 3 and/or to implement one or more components as in FIG. 1 or FIG. 2.

System 400 includes a central processing unit (CPU) 402, one or more I/O device interfaces that may allow for the connection of various I/O devices 404 (e.g., keyboards, displays, mouse devices, pen input, etc.) to the system 400, network interface 406, a memory 408, and an interconnect 412. It is contemplated that one or more components of system 400 may be located remotely and accessed via a network 410. It is further contemplated that one or more components of system 400 may comprise physical components or virtualized components.

CPU 402 may retrieve and execute programming instructions stored in the memory 408. Similarly, the CPU 402 may retrieve and store application data residing in the memory 408. The interconnect 412 transmits programming instructions and application data, among the CPU 402, I/O device interface 404, network interface 406, and memory 408. CPU 402 is included to be representative of a single CPU, multiple CPUs, a single CPU having multiple processing cores, and other arrangements.

Additionally, the memory 408 is included to be representative of a random access memory or the like. In some embodiments, memory 408 may comprise a disk drive, solid state drive, or a collection of storage devices distributed across multiple storage systems. Although shown as a single unit, the memory 408 may be a combination of fixed and/or removable storage devices, such as fixed disc drives, removable memory cards or optical storage, network attached storage (NAS), or a storage area-network (SAN).

As shown, memory 408 includes machine learning model 413, user data processing engine 414, form processing engine 416, and support engine 418. Machine learning model 413 may be representative of the machine learning model 140 of FIG. 1. In some embodiments, user data processing engine 414 may be representative of user data processing engine 100 of FIG. 1 and FIG. 2. Form processing engine 416 may be representative of the form processing engine 120 of FIG. 1 and FIG. 2. Support engine 418 may be representative of support engine 150 of FIG. 1.

Memory 408 further comprises forms 420, which may correspond to forms 103 of FIG. 1 and FIG. 2. Memory 408 further comprises machine learning model outputs 422 which may correspond to prediction 145 of FIG. 1. Memory 408 further comprises historical data 424, which may include historical user data 210 and historical form data 215 of FIG. 2. Memory 408 further comprises user data 426, which may correspond to user data 205 of FIG. 2. Memory 408 further comprises form data 428, which may correspond to form data 200 of FIG. 2.

It is noted that in some embodiments, system 400 may interact with one or more external components, such as via network 410, in order to retrieve data and/or perform operations.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of assisting users in completing forms, comprising:
    retrieving data associated with a form, wherein the data associated with the form comprises:
        a total number of fields of the form, and
        an indication of a level of complexity of a field of the form;
    retrieving data associated with a user, wherein the data associated with the user comprises:
        a number of fields of the form the user has completed, and
        an amount of time the user has spent completing a respective field of the form;
    providing the data associated with the form and the data associated with the user to a machine learning model, wherein the machine learning model has been trained to generate a prediction comprising one or more of:
        a predicted amount of user progress in completing the form, or
        a predicted time required for the user to complete a given field of the form; and
    receiving the prediction from the machine learning model in response to the data associated with the form and the data associated with the user.

2. The method of claim 1, wherein the machine learning model is retrained based on the data associated with the form and the data associated with the user.

3. The method of claim 1, wherein one or more user support interventions are performed based on the user taking a longer amount of time than the predicted time required for the user to complete the given field of the form.

4. The method of claim 1, wherein the prediction further comprises a predicted level of complexity of a particular field of the form.

5. The method of claim 4, wherein the machine learning model has been trained to generate the predicted level of complexity based on amounts of time that historical users took to complete the particular field.

6. The method of claim 4, wherein the predicted amount of user progress in completing the form is predicted based on the predicted level of complexity of the particular field of the form.

7. The method of claim 4, wherein the predicted time required for the user to complete the particular field of the form is predicted based on the predicted level of complexity of the field.

8. The method of claim 1, wherein the prediction further comprises a predicted proficiency of the user.

9. The method of claim 8, wherein the predicted amount of user progress in completing the form is predicted based on the predicted proficiency of the user.

10. The method of claim 8, wherein the predicted time required for the user to complete the given field of the form is predicted based on the predicted proficiency of the user.

11. The method of claim 1, wherein the machine learning model comprises a neural network that has been trained based on historical data associated with users and forms.

12. The method of claim 1, wherein the prediction is based on an amount of required information associated with uncompleted fields of the form that is available to be automatically entered into the form.

13. The method of claim 1, further comprising performing one or more actions within a software application based on the prediction.

14. A system for assisting users in completing forms, comprising:
one or more processors; and
a memory comprising instructions that, when executed by the one or more processors, cause the system to:
retrieve data associated with a form, wherein the data associated with the form comprises:
a total number of fields of the form, and
an indication of a level of complexity of a field of the form;
retrieve data associated with a user, wherein the data associated with the user comprises:
a number of fields of the form the user has completed, and
an amount of time the user has spent completing a respective field of the form;
provide the data associated with the form and the data associated with the user to a machine learning model, wherein the machine learning model has been trained to generate a prediction comprising one or more of:
a predicted amount of user progress in completing the form, or
a predicted time required for the user to complete a given field of the form; and
receive the prediction from the machine learning model in response to the data associated with the form and the data associated with the user.

15. The system of claim 14, wherein the machine learning model is retrained based on the data associated with the form and the data associated with the user.

16. The system of claim 14, wherein one or more user support interventions are performed based on the user taking a longer amount of time than the predicted time required for the user to complete the given field of the form.

17. The system of claim 14, wherein the prediction further comprises a predicted level of complexity of a particular field of the form.

18. The system of claim 17, wherein the predicted time required for the user to complete the particular field of the form is predicted based on the predicted level of complexity of the field.

19. The system of claim 14, wherein the prediction further comprises a predicted proficiency of the user.

20. A non-transitory computer-readable medium comprising instructions that, when executed by one or more processors of a computing system, cause the computing system to:
retrieve data associated with a form, wherein the data associated with the form comprises:
a total number of fields of the form, and
an indication of a level of complexity of a field of the form;
retrieve data associated with a user, wherein the data associated with the user comprises:
a number of fields of the form the user has completed, and
an amount of time the user has spent completing a respective field of the form;
provide the data associated with the form and the data associated with the user to a machine learning model, wherein the machine learning model has been trained to generate a prediction comprising one or more of:
a predicted amount of user progress in completing the form, or
a predicted time required for the user to complete a given field of the form; and
receive the prediction from the machine learning model in response to the data associated with the form and the data associated with the user.

* * * * *